United States Patent
Yang et al.

(10) Patent No.: US 8,223,300 B2
(45) Date of Patent: Jul. 17, 2012

(54) COLOR FILTERS AND DISPLAY DEVICE HAVING COLOR FILTERS

(75) Inventors: Seok-Yoon Yang, Cheonan-si (KR); Ji-Young Jeong, Cheongan-si (KR); Ju-Yong Park, Cheonan-si (KR); Woo-Man Ji, Asan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 762 days.

(21) Appl. No.: 12/345,150

(22) Filed: Dec. 29, 2008

(65) Prior Publication Data

US 2009/0303418 A1    Dec. 10, 2009

(30) Foreign Application Priority Data

Jun. 5, 2008   (KR) .................. 10-2008-0053393

(51) Int. Cl.
   *G02F 1/1335* (2006.01)
(52) U.S. Cl. ...................................... 349/106
(58) Field of Classification Search ............ None
   See application file for complete search history.

(56) References Cited

U.S. PATENT DOCUMENTS

| | | | |
|---|---|---|---|
| 4,934,791 A * | 6/1990 | Shimizu et al. | 349/107 |
| 6,280,890 B1 | 8/2001 | Sawamura et al. | |
| 7,550,319 B2 * | 6/2009 | Wang et al. | 438/125 |
| 2007/0247565 A1 | 10/2007 | Sasaki et al. | |

FOREIGN PATENT DOCUMENTS

| | | |
|---|---|---|
| JP | 2005-025175 | 1/2005 |
| JP | 2007-101742 | 4/2007 |
| JP | 2007-199685 | 8/2007 |
| JP | 2007-304391 | 11/2007 |
| JP | 2008-009323 | 1/2008 |
| KR | 1020050030787 A | 3/2005 |
| KR | 1020060129680 A | 12/2006 |
| KR | 1020070028358 A | 3/2007 |
| KR | 1020070059204 A | 6/2007 |
| KR | 1020070115797 A | 12/2007 |
| KR | 1020080005349 A | 1/2008 |
| KR | 1020080006452 A | 1/2008 |

* cited by examiner

*Primary Examiner* — Lucy Chien
(74) *Attorney, Agent, or Firm* — F. Chau & Associates, LLC

(57) ABSTRACT

A color filter may include a red pigment as a main component of a pigment, and at least one of a green pigment and a blue pigment as an additional pigment at 0.5-10 wt % among the entire pigment. The color filter may include a green pigment as a main component of a pigment, and at least one of a red pigment, a blue pigment, and a violet pigment at 0.5-10 wt % as an additional pigment among the entire pigment. The color filter may include a blue pigment as the main component of the pigment, and at least one of a red pigment and a green pigment as the additional pigment at 0.5-10 wt % among the entire pigment.

23 Claims, 4 Drawing Sheets

COLOR FILTERS AND DISPLAY DEVICE HAVING COLOR FILTERS

CROSS-REFERENCE TO RELATED APPLICATION

This application claims priority to and the benefit of Korean Patent Application No. 10-2008-0053393 filed in the Korean Intellectual Property Office on Jun. 5, 2008, the entire contents of which are incorporated herein by reference.

BACKGROUND OF THE INVENTION (a) Technical Field

The present disclosure relates to color filters and a display device including the color filters.

(b) Discussion of Related Art

A liquid crystal display or an organic light emitting device includes a color filter for filtering a desired color from a white light emitted from a white light source. The color filters may typically be a red color filter, a green color filter, and a blue color filter corresponding to red, green, and blue, which are the three primary colors of light.

The color filter passes only the component of a particular wavelength in the light emitted from the white light source and the remaining components are absorbed by the color filter. The light purity of the light having passed through the color filter is deteriorated when the white light source includes light components having indefinite wavelengths that are not filtered by the color filters, and it is thereby difficult to display a desired color.

For low consumption of power and a thin thickness of the display, the light generated from a white light emitting diode (LED) provided as a backlight of the liquid crystal display does not have a peak at the red and green components, but has the peak at the yellow color, which is a middle region between the red component and the green component. Accordingly, the light having passed through the red color filter and the green color filter includes the yellow color component such that a yellowish phenomenon in which the red or the green become quite yellow may be generated. Accordingly, the white color become yellowish such that the white color temperature is deteriorated, and the color coordinate deviates excessively from a target value, thereby deteriorating the color characteristics of the display device.

The above information disclosed in this Background section is only to enhance understanding of the background of the invention and therefore it may contain information that does not form the prior art that is already known in this country to a person of ordinary skill in the art.

SUMMARY OF THE INVENTION

Exemplary embodiments of the present invention improve the color characteristics of the display device.

Exemplary embodiments of the present invention position the color coordinate of the white color displayed by the display device close to the target value.

According to an exemplary embodiment of the present invention, the color filter may include a red pigment as a main component of a pigment, and at least one of a green pigment and a blue pigment as an additional pigment at 0.5-10 wt % among the entire pigment. Also, the color filter may include a green pigment as a main component of a pigment, and at least one of a red pigment, a violet pigment, and a blue pigment at 0.5-10 wt % among the entire pigment as an additional pigment. Also, the color filter may include a blue pigment as a main component of a pigment, and at least one of a red pigment and a green pigment at 0.5-10 wt % among the entire pigment as an additional pigment.

In an exemplary embodiment, the red pigment may include at least one of C.I. Pigment•Red 1, C.I. Pigment•Red 2, C.I. Pigment•Red 3, C.I. Pigment•Red 4, C.I. Pigment•Red 5, C.I. Pigment•Red 6, C.I. Pigment•Red 7, C.I. Pigment•Red 8, C.I. Pigment•Red 9, C.I. Pigment•Red 10, C.I. Pigment•Red 11, C.I. Pigment•Red 12, C.I. Pigment•Red 14, C.I. Pigment•Red 15, C.I. Pigment•Red 16, C.I. Pigment•Red 17, C.I. Pigment•Red 18, C.I. Pigment•Red 19, C.I. Pigment•Red 21, C.I. Pigment•Red 22, C.I. Pigment•Red 23, C.I. Pigment•Red 30, C.I. Pigment•Red 31, C.I. Pigment•Red 32, C.I. Pigment•Red 37, C.I. Pigment•Red 38, C.I. Pigment•Red 40, C.I. Pigment•Red 41, C.I. Pigment•Red 42, C.I. Pigment•Red 48:1, C.I. Pigment•Red 48:2, C.I. Pigment•Red 48:3, C.I. Pigment•Red 48:4, C.I. Pigment•Red 49:1, C.I. Pigment•Red 49:2, C.I. Pigment•Red 50:1, C.I. Pigment•Red 52:1, C.I. Pigment•Red 53:1, C.I. Pigment•Red 57, C.I. Pigment•Red 57:1, C.I. Pigment•Red 57:2, C.I. Pigment•Red 58:2, C.I. Pigment•Red 58:4, C.I. Pigment•Red 60:1, C.I. Pigment•Red 63:1, C.I. Pigment•Red 63:2, C.I. Pigment•Red 64:1, C.I. Pigment•Red 81:1, C.I. Pigment•Red 83, C.I. Pigment•Red 88, C.I. Pigment•Red 90:1, C.I. Pigment•Red 97, C.I. Pigment•Red 101, C.I. Pigment•Red 102, C.I. Pigment•Red 104, C.I. Pigment•Red 105, C.I. Pigment•Red 106, C.I. Pigment•Red 108, C.I. Pigment•Red 112, C.I. Pigment•Red 113, C.I. Pigment•Red 114, C.I. Pigment•Red 122, C.I. Pigment•Red 123, C.I. Pigment•Red 144, C.I. Pigment•Red 146, C.I. Pigment•Red 149, C.I. Pigment•Red 150, C.I. Pigment•Red 151, C.I. Pigment•Red 166, C.I. Pigment•Red 168, C.I. Pigment•Red 170, C.I. Pigment•Red 171, C.I. Pigment•Red 172, C.I. Pigment•Red 174, C.I. Pigment•Red 175, C.I. Pigment•Red 176, C.I. Pigment•Red 177, C.I. Pigment•Red 178, C.I. Pigment•Red 179, C.I. Pigment•Red 180, C.I. Pigment•Red 185, C.I. Pigment•Red 187, C.I. Pigment•Red 188, C.I. Pigment•Red 190, C.I. Pigment•Red 193, C.I. Pigment•Red 194, C.I. Pigment•Red 202, C.I. Pigment•Red 206, C.I. Pigment•Red 207, C.I. Pigment•Red 208, C.I. Pigment•Red 209, C.I. Pigment•Red 215, C.I. Pigment•Red 216, C.I. Pigment•Red 220, C.I. Pigment•Red 224, C.I. Pigment•Red 226, C.I. Pigment•Red 242, C.I. Pigment•Red 243, C.I. Pigment•Red 245, C.I. Pigment•Red 254, C.I. Pigment•Red 255, C.I. Pigment•Red 264, and C.I. Pigment•Red 265. In an exemplary embodiment the green pigment may include at least one of C.I. Pigment•Green 7, C.I. Pigment•Green 36, and C.I. Pigment•Green 58, the blue pigment may include at least one C.I. Pigment•Blue 15, C.I. Pigment•Blue 15:3, C.I. Pigment•Blue 15:4, C.I. Pigment•Blue 15:6, C.I. Pigment•Blue 60. In an exemplary embodiment the violet pigment may include C.I. Pigment•Violet 1, C.I. Pigment•Violet 19, C.I. Pigment•Violet 23, C.I. Pigment•Violet 29, C.I. Pigment•Violet 32, C.I. Pigment•Violet 36, and C.I. Pigment•Violet 38.

A display device according to an exemplary embodiment of the present invention includes a liquid crystal panel including a red color filter, a green color filter, and a blue color filter, and a backlight unit providing the light to the liquid crystal panel, wherein the red color filter includes a red pigment as a main component of a pigment, and at least one of a green pigment and a blue pigment as an additional pigment at 0.5-10 wt % among the entire pigment.

A display device according to an exemplary embodiment of the present invention includes a liquid crystal panel including a red color filter, a green color, filter and a blue color filter, and a backlight unit providing the light to the liquid crystal panel, wherein the green color filter includes a green pigment as a main component of a pigment, and at least one of a red pigment, a blue pigment, and a violet pigment at 0.5-10 wt % as an additional pigment among and the entire pigment.

A display device according to an exemplary embodiment of the present invention includes a liquid crystal panel including a red color filter, a green color filter, and a blue color filter, and a backlight unit providing the light to the liquid crystal panel wherein the blue color filter includes a blue pigment as the main component of the pigment, and at least one of a red pigment and a green pigment as an additional pigment at 0.5-10 wt % among the entire pigment.

The light source of the backlight unit may be a white LED manufactured by applying a YAG florescent to a blue light emitting diode (LED) chip, or a silicate florescent to a blue light emitting diode (LED) chip.

A display device according to an exemplary embodiment of the present invention includes: a plurality of pixel electrodes; a common electrode facing the pixel electrodes; a white organic light emitting member inserted between the pixel electrodes and the common electrode; and a red color filter, a green color filter and a blue color filter respectively facing the pixel electrodes, wherein the red color filter includes a red pigment as a main component of a pigment, and at least one of a green pigment and a blue pigment as an additional pigment at 0.5-10 wt % among the entire pigment.

A display device according to an exemplary embodiment of the present invention includes: a plurality of pixel electrodes; a common electrode facing the pixel electrodes; a white organic light emitting member inserted between the pixel electrodes and the common electrode; and a red color filter, a green color filter, and a blue color filter respectively facing the pixel electrodes, wherein the green color filter includes a green pigment as a main component of a pigment and at least one of a red pigment, a blue pigment, and a violet pigment at 0.5-10 wt % as an additional pigment among the entire pigment.

A display device according to an exemplary embodiment of the present invention includes: a plurality of pixel electrodes; a common electrode facing the pixel electrodes; a white organic light emitting member inserted between the pixel electrodes and the common electrode; and a red color filter, a green color filter, and a blue color filter respectively facing the pixel electrodes, wherein the blue color filter includes a blue pigment as the main component of the pigment, and at least one of a red pigment and a green pigment as an additional pigment at 0.5-10 wt % among the entire pigment.

The color filter according to an exemplary embodiment of the present invention includes the different color pigment corresponding to the different color filter such that white light close to the target values of the color coordinates of the white light of the display device can be displayed, thereby improving color characteristics such as a white balance.

BRIEF DESCRIPTION OF THE DRAWINGS

Exemplary embodiments will be understood in more detail from the following descriptions taken in conjunction with the attached drawings.

DETAILED DESCRIPTION OF EXEMPLARY EMBODIMENTS

The present invention will be described more fully hereinafter with reference to the accompanying drawings, in which exemplary embodiments of the invention are shown. As those of ordinary skill in the art would realize, the described embodiments may be modified in various different ways, all without departing from the spirit or scope of the present invention.

Figure 1:
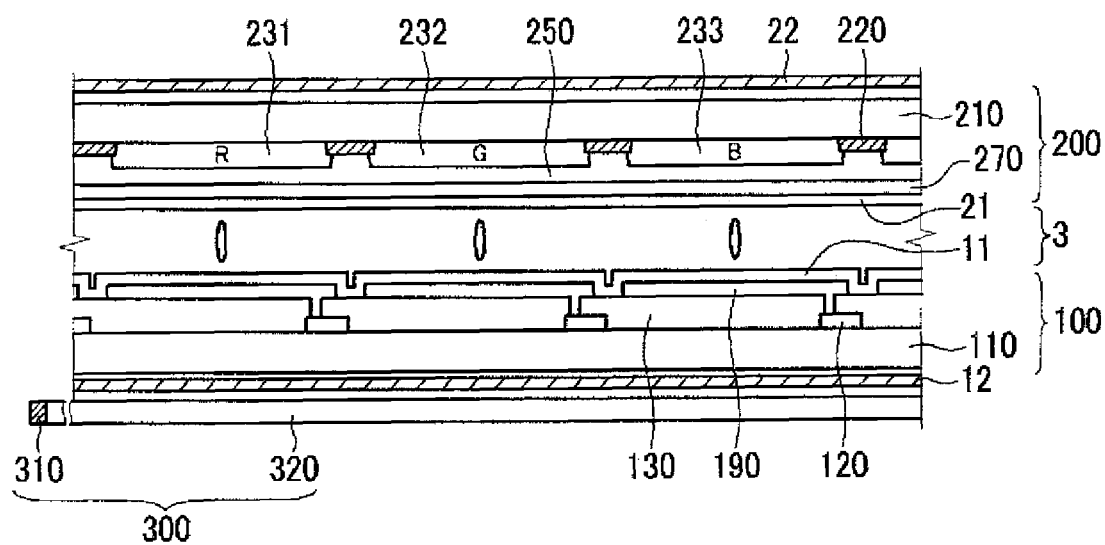
FIG. 1 is a cross-sectional view of a liquid crystal display according to an exemplary embodiment of the present invention.

FIG. 1 is a cross-sectional view of a liquid crystal display according to an exemplary embodiment of the present invention.

A liquid crystal display according to an exemplary embodiment of the present invention includes a liquid crystal panel having a thin film transistor array panel 100, a common electrode panel 200, and a liquid crystal layer 3 interposed between the two display panels, and a backlight unit 300 providing light to the liquid crystal panel. Also, the liquid crystal display according to an exemplary embodiment of the present invention may include a lower polarizer 12 disposed between the backlight unit 300 and the thin film transistor array panel 100, an upper polarizer 22 disposed on the common electrode panel 200, and compensation films (not shown).

The thin film transistor array panel 100 includes an insulating substrate 110, signal lines (not shown) such as gate lines and data lines formed on the insulating substrate 110, thin film transistors 120, and pixel electrodes 190 receiving image signal voltages through the thin film transistors 120. The thin film transistor array panel 100 may include an insulating layer 130 such as a passivation layer or an interlayer insulating layer formed between the thin film transistor 120 and the pixel electrode 190, and an alignment layer 11 formed on the pixel electrode 190.

The common electrode panel 200 includes an insulating substrate 210, a light blocking member 220, and color filters 231, 232, and 233 formed on the insulating substrate 210, an overcoat 250 covering the light blocking member 220 and the color filters 231, 232, and 233, and a common electrode 270 formed on the overcoat 250. The overcoat 250 may be omitted. Also, the common electrode panel 200 may include an alignment layer 21 formed on the common electrode 270.

In this exemplary embodiment the color filters 231, 232, and 233 include a red color filter 231, a green color filter 232, and a blue color filter 233. These color filters 231, 232, and 233 may include different pigments, as well as the pigments for displaying the corresponding color.

The red color filter 231 includes a red pigment as a main component of a pigment, and at least one of a green pigment and a blue pigment as an additional pigment at 0.5-10 wt % of the entire pigment. If necessary, a violet pigment may be included. If the green pigment or the blue pigment is added to the red color filter 231, the red component is partially absorbed such that the luminance may be somewhat decreased, however the additional pigment filters the yellow components that are not sufficiently filtered by the red pigment so that the color purity of the red color may be improved. In this exemplary embodiment, when the additional pigment is less than 0.5 wt %, the improvement effect of the color purity appears to be minimal, and when the additional pigment is more than 10 wt %, the luminance is excessively deteriorated so that it may not be used as a color filter.

The green color filter 232 includes a green pigment as the main component of the pigment, and at least one of the red pigment, the blue pigment, and the violet pigment as an additional pigment at 0.5-10 wt % of the entire pigment. If the green pigment the blue pigment, or the violet pigment is added to the green color filter 232, the green component is partially absorbed such that the luminance may be somewhat decreased, however the additional pigment filters the yellow components that are not sufficiently filtered by the red pigment so that the color purity of the green color is improved. In this exemplary embodiment, when the additional pigment is less than 0.5 wt %, the improvement effect of the color purity appears to be minimal, and when the additional pigment is more than 10 wt %, the luminance is excessively deteriorated so that it may not be used as a color filter.

The blue color filter 233 includes a blue pigment as a main component of a pigment, and at least one of a red pigment and a green pigment as an additional pigment at 0.5-10 wt % of the entire pigment. If the red pigment or the blue pigment is added to the blue color filter 233, the blue component is partially absorbed such that the luminance may be somewhat decreased, however, the additional pigment filters the yellow components that are not sufficiently filtered by the red pigment so that the color purity of the blue color is improved. In this exemplary embodiment, when the additional pigment is less than 0.5 wt %, the improvement effect of the color purity appears to be minimal, and when the additional pigment is more than 10 wt %, the luminance is excessively deteriorated so that it may not be used as a color filter.

The above-described red pigment may be one selected from C.I. Pigment•Red 1, C.I. Pigment•Red 2, C.I. Pigment•Red 3, C.I. Pigment•Red 4, C.I. Pigment•Red 5, C.I. Pigment•Red 6, C.I. Pigment•Red 7, C.I. Pigment•Red 8, C.I. Pigment•Red 9, C.I. Pigment•Red 10, C.I. Pigment•Red 11, C.I. Pigment•Red 12, C.I. Pigment•Red 14, C.I. Pigment•Red 15, C.I. Pigment•Red 16, C.I. Pigment•Red 17, C.I. Pigment•Red 18, C.I. Pigment•Red 19, C.I. Pigment•Red 21, C.I. Pigment•Red 22, C.I. Pigment•Red 23, C.I. Pigment•Red 30, C.I. Pigment•Red 31, C.I. Pigment•Red 32, C.I. Pigment•Red 37, C.I. Pigment•Red 38, C.I. Pigment•Red 40, C.I. Pigment•Red 41, C.I. Pigment•Red 42, C.I. Pigment•Red 48:1, C.I. Pigment•Red 48:2, C.I. Pigment•Red 48:3, C.I. Pigment•Red 48:4, C.I. Pigment•Red 49:1, C.I. Pigment•Red 49:2, C.I. Pigment•Red 50:1, C.I. Pigment•Red 52:1, C.I. Pigment•Red 53:1, C.I. Pigment•Red 57, C.I. Pigment•Red 57:1, C.I. Pigment•Red 57:2, C.I. Pigment•Red 58:2, C.I. Pigment•Red 58:4, C.I. Pigment•Red 60:1, C.I. Pigment•Red 63:1, C.I. Pigment•Red 63:2, C.I. Pigment•Red 64:1, C.I. Pigment•Red 81:1, C.I. Pigment•Red 83, C.I. Pigment•Red 88, C.I. Pigment•Red 90:1, C.I. Pigment•Red 97, C.I. Pigment•Red 101, C.I. Pigment•Red 102, C.I. Pigment•Red 104, C.I. Pigment•Red 105, C.I. Pigment•Red 106, C.I. Pigment•Red 108, C.I. Pigment•Red 112, C.I. Pigment•Red 113, C.I. Pigment•Red 114, C.I. Pigment•Red 122, C.I. Pigment•Red 123, C.I. Pigment•Red 144, C.I. Pigment•Red 146, C.I. Pigment•Red 149, C.I. Pigment•Red 150, C.I. Pigment•Red 151, C.I. Pigment•Red 166, C.I. Pigment•Red 168, C.I. Pigment•Red 170, C.I. Pigment•Red 171, C.I. Pigment•Red 172, C.I. Pigment•Red 174, C.I. Pigment•Red 175, C.I. Pigment•Red 176, C.I. Pigment•Red 177, C.I. Pigment•Red 178, C.I. Pigment•Red 179, C.I. Pigment•Red 180, C.I. Pigment•Red 185, C.I. Pigment•Red 187, C.I. Pigment•Red 188, C.I. Pigment•Red 190, C.I. Pigment•Red 193, C.I. Pigment•Red 194, C.I. Pigment•Red 202, C.I. Pigment•Red 206, C.I. Pigment•Red 207, C.I. Pigment•Red 208, C.I. Pigment•Red 209, C.I. Pigment•Red 215, C.I. Pigment•Red 216, C.I. Pigment•Red 220, C.I. Pigment•Red 224, C.I. Pigment•Red 226, C.I. Pigment•Red 242, C.I. Pigment•Red 243, C.I. Pigment•Red 245, C.I. Pigment•Red 254, C.I. Pigment•Red 255, C.I. Pigment•Red 264, C.I. Pigment•Red 265, or a combination thereof.

Also, the green pigment may be one selected from C.I. Pigment•Green 7, C.I. Pigment•Green 36, C.I. Pigment•Green 58, or a combination thereof.

The blue pigment may be one selected from C.I. Pigment•Blue 15, C.I. Pigment•Blue 15:3, C.I. Pigment•Blue 15:4, C.I. Pigment•Blue 15:6, C.I. Pigment•Blue 60, or a combination thereof.

The violet pigment may be one selected from C.I. Pigment•Violet 1, C.I. Pigment•Violet 19, C.I. Pigment•Violet 23, C.I. Pigment•Violet 29, C.I. Pigment•Violet 32, C.I. Pigment•Violet 36, C.I. Pigment•Violet 38, or a combination thereof.

If at least one among the red color filter 231, the green color filter 232, and the blue color filter 233 includes the different color pigments, the color purity of the corresponding color may be improved, and the white color coordinate may be close to Wx=0.313 and Wy=0.329 that are the target values of the display device.

According to the addition of the different color pigments, an optical initiator may be further added in an amount of 1 wt %-5 wt % to prevent the deterioration of the exposure sensitivity of the photoresist when manufacturing the color filters 231, 232, and 233.

The liquid crystal layer 3 interposed between the thin film transistor array panel 100 and the common electrode panel 200 may be one selected from all of the well-known liquid crystal modes, such as a vertical alignment (VA) mode, a twisted nematic (TN) mode, and an optically compensated bend (OCB) mode. Exemplary embodiments of the present invention may be applied to an in-plane switching (IPS) mode in which a pixel electrode and a common electrode are formed together on the thin film transistor array panel 100, and the common electrode 270 of the common electrode panel 200 is omitted and the pixel electrode and the common electrode are formed with a stripe shape in the thin film transistor array panel 100.

The backlight unit 300 includes an LED 310 as a light source, and a light guide 320. The light source may be chosen from various light sources such as a CCFL (cold cathode fluorescent light) or an EEFL (external electrode fluorescent light), however, the effects according to the exemplary embodiment of the present invention may be particularly improved in the case in which the LED 310 is used as the light source.

Next, the effects of exemplary embodiments of the present invention will be described with reference to FIG. 2 to FIG. 4.

Figure 2:
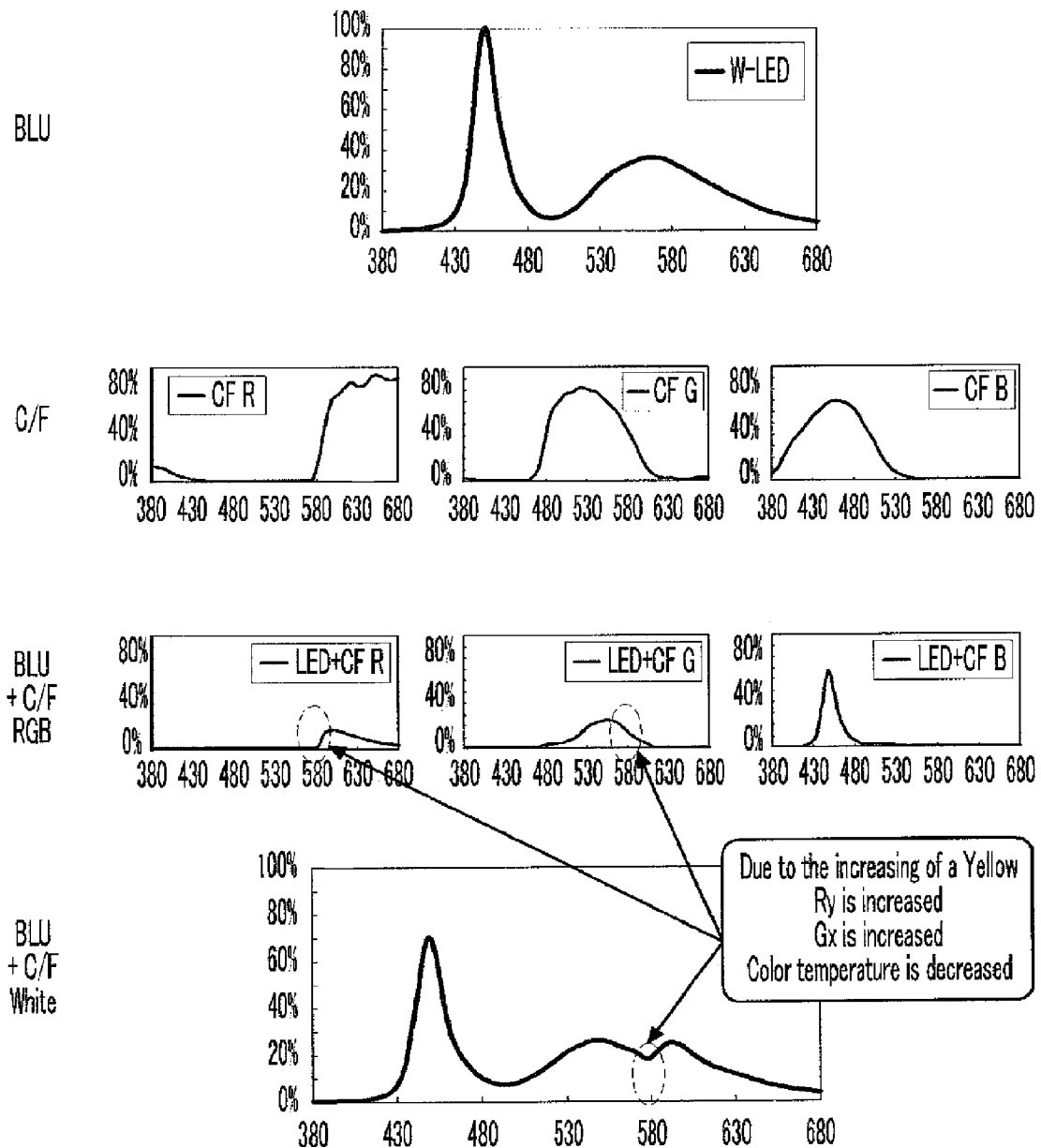
FIG. 2 includes spectral response curves used to explain the reason that a white LED used as a light source largely includes the yellow component in a liquid crystal display.

FIG. 2 are spectral response curves used to explain the reason that a white LED used as a light source largely includes the yellow component in a liquid crystal display.

In FIG. 2, the graph of BLU indicates the spectrum of the light emitted from a white LED, and as seen a peak appears in a blue region and a lower, smooth peak appears in a yellow region. This means that the yellow component that is in the middle region between red and the green is largely included in the white LED light. It is this yellow light that is to be minimized.

Further, in FIG. 2, the graphs of C/F respectively indicate the transmittance wavelengths of a red color filter 231, a green color filter 232, and a blue color filter 233.

In FIG. 2, a graph of BLU+C/F RGB is a spectrum of the light in which the light emitted from the white LED is transmitted through a red color filter 231, a green color filter 232, and a blue color filter 233.

En FIG. 2, a graph of BLU+C/F White is a spectrum of the white light generated by combining the three graphs of BLU+C/F RGB generated by mixing the lights that are transmitted through a red color filter 231, a green color filter 232, and a blue color filter 233. As shown in FIG. 2, the white light generated by combining the lights is transmitted through the red color filter 231, the green color filter 232, and the blue color filter 233 and includes the yellow components. Accordingly, the white light becomes yellowish such that the color coordinate of the white color is deviated from Wx=0.313 and Wy=0.329, which are the target values of the display device.

Figure 3:
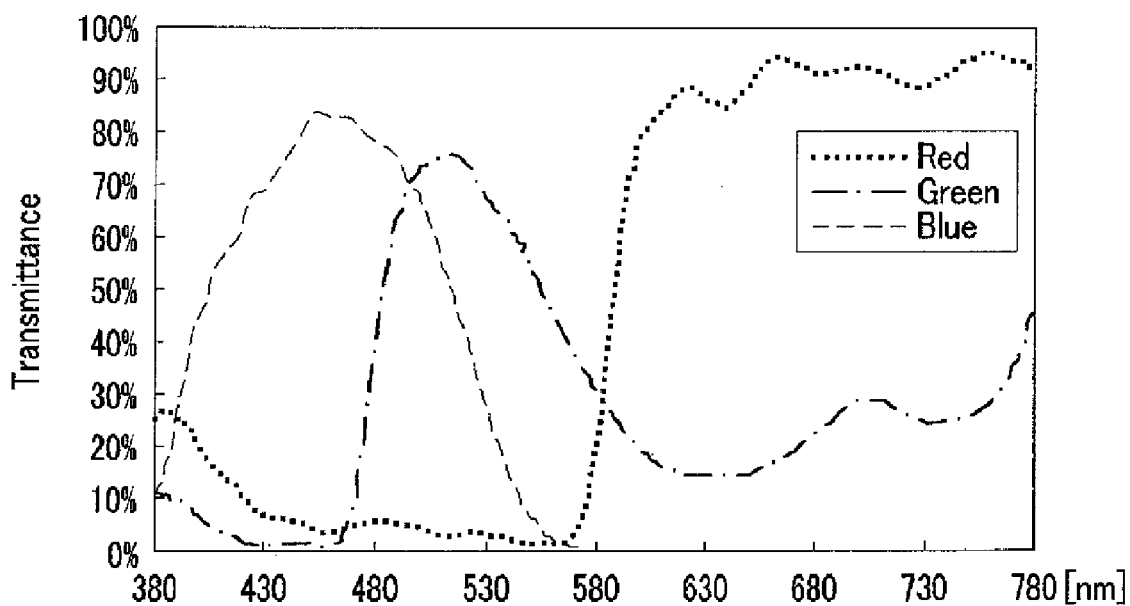
FIG. 3 is a graph showing a spectrum of color filters of a liquid crystal display according to an exemplary embodiment of the present invention.
Figure 4:
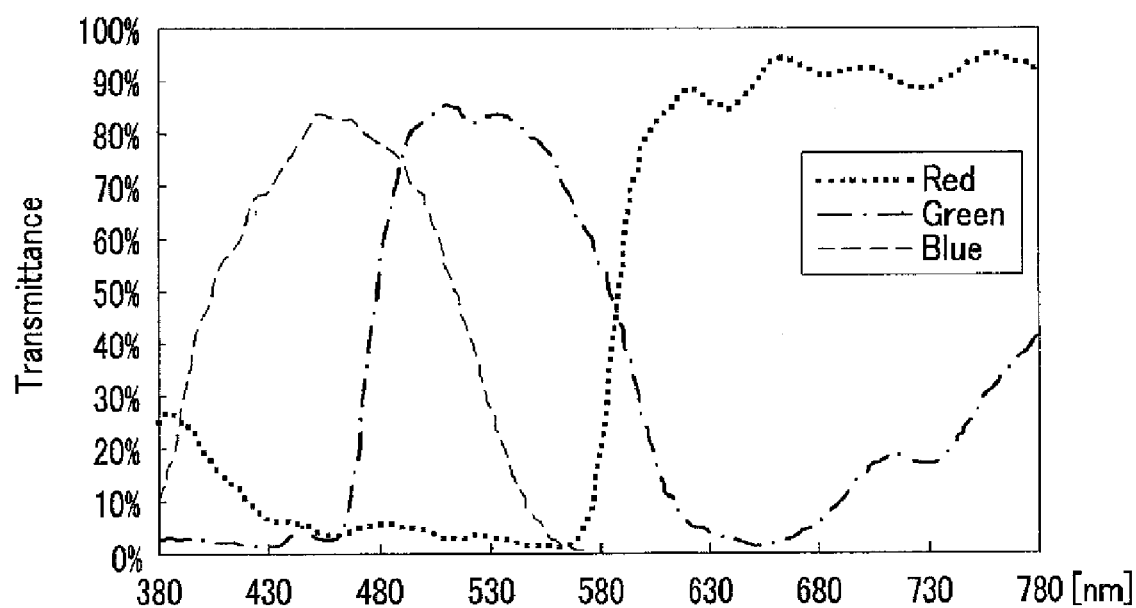
FIG. 4 is a graph showing a spectrum of color filters of a conventional liquid crystal display compared with the exemplary embodiment of FIG. 3.

FIG. 3 is a graph showing a spectrum of the color filters of a liquid crystal display according to an exemplary embodiment of the present invention, and FIG. 4 is a graph showing a spectrum of the color filters of a conventional liquid crystal display compared with FIG. 3.

FIG. 3 is a spectrum showing the transmitted light of each color filter when the green color filter is formed of C.I. Pigment•Green 36 and C.I. Pigment•Yellow 150 by adding C.I. Pigment•Blue 15:6 at about 1 wt %, and the different pigments are not included to the red color filter and the blue color filter. FIG. 4 is a spectrum of the light transmitted through the red color filter, the green color filter, and the blue color filter that do not include the different color pigments. Comparing FIG. 3 and FIG. 4, in the liquid crystal display according to an exemplary embodiment of the present invention, a green component is decreased near 580 nm such that the white color light includes the small amount of the green component near 580 nm. This is shown in Table 1 below.

TABLE 1

|  | Color PR without different color pigments | Color PR including different color pigments | |
|---|---|---|---|
| Rx | 0.583 | 0.583 | |
| Ry | 0.320 | 0.320 | |
| RY | 23.8 | 23.8 | |
| Gx | 0.285 | 0.285 | G36 + Y150→ |
| Gy | 0.546 | 0.544 | G36 + Y150 + B15:6 |
| GY | 63.5 | 47.5 | |
| Bx | 0.136 | 0.136 | |
| By | 0.143 | 0.143 | |
| BY | 18.8 | 18.8 | |
| Wx | 0.293 | 0.293 | |
| Wy | 0.329 | 0.307 | |
| WY | 35.4 | 30.1 | |
| Color temperature | 7683 K | 8066 K | |

As shown in Table 1, x, y coordinates of each color are almost maintained as is (the y coordinate of the green is slightly changed but it is not a meaningful value change), however the Y value corresponding to the luminance (WY) is largely decreased in the green when the green color filter includes a blue pigment, that is, including the different color pigment, compared with the case in which the green color filter does not include the blue pigment, without the different color pigment, such that the x, y coordinates Wx and Wy of the white color and the luminance WY are changed. When a white light emitting diode (LED) manufactured by applying these color filters, that is, including the different color pigment, to a blue light emitting diode (LED) chip as a YAG fluorescent is used as a light source of a liquid crystal display, the white light close to Wx=0.313 and Wy=0.329 that are the target values of the color coordinates of the white light of the display device may be realized.

The white color appears by the combination of the red light, the green light, and the blue light having passed through the red color filter, the green color filter, and the blue color filter such that the coordinates Wx and Wy of the white color are as follows:

$$Wx = \frac{WX}{WX + WY + WZ}$$

$$= \frac{(RX + GX + BX)}{(RX + GX + BX) + (RY + GY + BY) + (RZ + GZ + BZ)}$$

$$= \frac{(RX + GX + BX)}{(RX + RY + RZ) + (GX + GY + GZ) + (BX + BY + BZ)}$$

$$Wy = \frac{WY}{WX + WY + WZ},$$

$$= \frac{(RY + GY + BY)}{(RX + GX + BX) + (RY + GY + BY) + (RZ + GZ + BZ)}$$

$$= \frac{(RY + GY + BY)}{(RX + RY + RZ) + (GX + GY + GZ) + (BX + BY + BZ)}$$

$RX + RY + RZ = RY/Ry$, $GX + GY + GZ/Gy$, $BX + BY + BZ = BY/By$, $RX = (Rx/Ry)RY$, $GX = (Gx/Gy)GY$, and $BX = (Bx/By)BY$, such that $$Wx = \frac{Rx/RyRY + Gx/GyGY + Bx/ByBY}{1/RyRY + 1/GyGY + 1/ByBY}$$

$$Wy = \frac{RY + GY + BY}{1/RyRY + 1/GyGY + 1/ByBY}.$$

Here, Rx, Ry, Cx, Cy, Bx, and By are constant numbers and Wx and Wy are functions having only RY, GY, and BY as variables in the case that the different color pigment is not included. Accordingly, RY, GY, and BY must be controlled to control Wx and Wy, however it is impossible to only control the luminance Y by more than 5% in the state that x and y are fixed under the current pigment characteristics. As shown in an exemplary embodiment of the present invention, if the different color pigment is added, the luminance Y may be largely adjusted by more than 10%.

The following Table 2 shows the change of the color coordinates in the case that the different color pigment is respectively included in the green color filter and the blue color filter and the case that the different color pigment is not included. In Table 2, the case that the white different color pigment is included means that a green color filter is formed by adding C.I. Pigment•Blue 15:6 at about 1 wt % to C.I. Pigment•Green 36 and C.I. Pigment•Yellow 150; the blue color filter is formed by adding C.I. Pigment•Green 36 at about 1 wt % to C.I. Pigment•Blue 15:6 and C.I. Pigment•Violet 23; and the different color pigment is not included in the red color filter.

TABLE 2

|  | Color PR without different color pigments | Color PR including different color pigments | |
|---|---|---|---|
| Rx | 0.613 | 0.613 | |
| Ry | 0.324 | 0.323 | |
| RY | 21.5 | 21.8 | |
| Gx | 0.282 | 0.281 | G36 + Y150→ |
| Gy | 0.525 | 0.525 | G36 + Y150 + B15:6 |
| GY | 60.4 | 50.8 | |
| Bx | 0.148 | 0.148 | G36 + V23→ |
| By | 0.187 | 0.187 | G36 + V23 + G36 |
| BY | 25.4 | 22.1 | |
| Wx | 0.294 | 0.305 | |
| Wy | 0.338 | 0.335 | |
| WY | 35.8 | 31.6 | |
| Color temperature | 7440 K | 6868 K | |

As shown in Table 2, when the green color filter and the blue color filter respectively include the different color pigment, the x, y coordinates of each color are almost maintained as is (the x coordinate of the green is slightly changed, however, it is not a meaningful value change) compared with the case that the different pigments are included, however, GY and BY corresponding to the luminance are largely decreased such that the x and y coordinates Wx and Wy of the white color become Wx=0.305 and Wy=0.335. When a white light emitting diode (LED) manufactured by applying these color filters, that is, including the different color pigment, to a blue light emitting diode (LED) chip as a silicate fluorescent used as a light source of a liquid crystal display, white light close to Wx=0.313 and Wy=0.329 that are the target values of the color coordinates of the white light of the display device may be realized.

Figure 5:
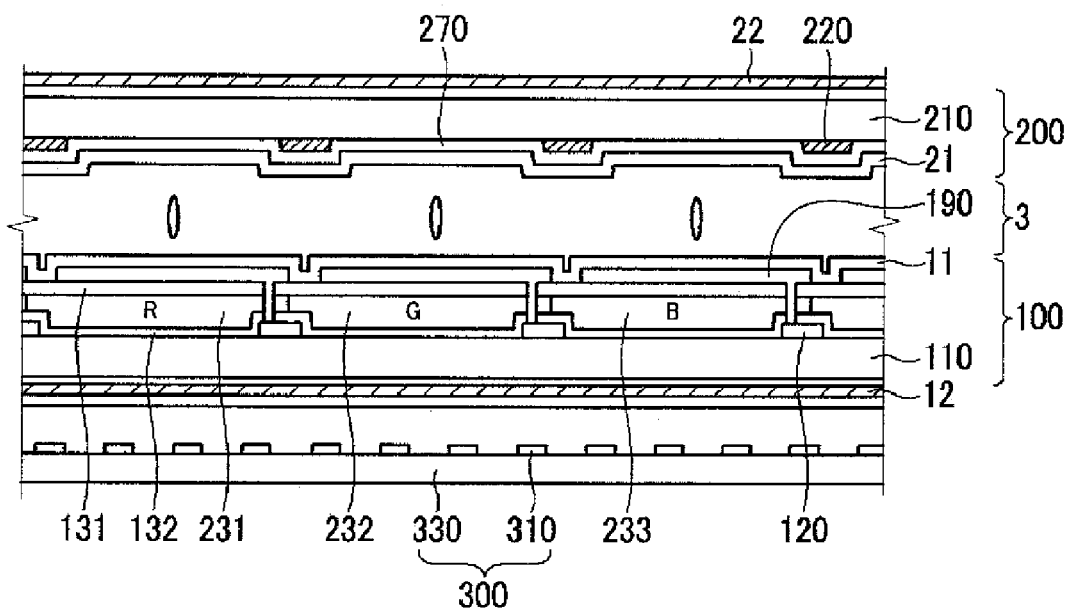
FIG. 5 is a cross-sectional view of a liquid crystal display according to an exemplary embodiment of the present invention.

FIG. 5 is a cross-sectional view of a liquid crystal display according to an exemplary embodiment of the present invention.

In a liquid crystal display shown in FIG. 5 compared with the liquid crystal display shown in FIG. 1, color filters 231, 232, and 233 are formed in a thin film transistor array panel 100, and a backlight unit 300 is a direct type.

In the liquid crystal display shown in FIG. 5, the color filters 231, 232, and 233 are disposed between a thin film transistor 120 and a pixel electrode 190, and insulating layers 131 and 132 are formed on and below the color filters 231, 232, and 233 to block the color filters 231, 232, and 233 from contacting the channel of the thin film transistor 120, and to prevent the color filters 231, 232, and 233 from being exposed to a liquid crystal layer 3. These insulating layers 131 and 132 may be omitted. The position of the color filters 231, 232, and 233 may be changed below the thin film transistor 120, or to a different layer.

A backlight unit 300 includes a substrate 330 such as a PCB and LEDs 310 that are arranged on the substrate, and the plurality of LEDs 310 are disposed under the liquid crystal panel such that the light emitted from the LEDs 310 is directly incident to the liquid crystal panel. The backlight unit 300 may be the edge type as shown in FIG. 1. Also, a backlight unit of the direct type shown in FIG. 5 may be used in the exemplary embodiment shown in FIG. 1.

In this liquid crystal display, the color filters 231, 232, and 233 may also include a different color pigment as well as the pigments to display their corresponding colors. That is, the red color filter 231 includes a red pigment as a main component of a pigment, and at least one of a green pigment and a blue pigment may be included at 0.5-10 wt % among the entire pigment as an additional pigment. If necessary, a violet color pigment may be included. Also, the green color filter 232 includes a green pigment as the main component of the pigment, and at least one of a red pigment, a violet pigment, and a blue pigment may be included at 0.5-10 wt % among the entire pigment as an additional pigment. Also, the blue color filter 233 includes a blue pigment as a main component of a pigment, and at least one of a red pigment and a green pigment may be included at 0.5-10 wt % among the entire pigment as an additional pigment.

In this exemplary embodiment, all of the red color filter 231, the green color filter 232, and the blue color filter 233 must not include the different pigment, if just one of red color filter 231, the green color filter 232 and the blue color filter 233 includes the different color pigment, white fight close to the target values of the color coordinates of the white light of the display device may be realized.

As above-described, the color filter including the different color pigment may be applied to an organic light emitting device.

Figure 6:
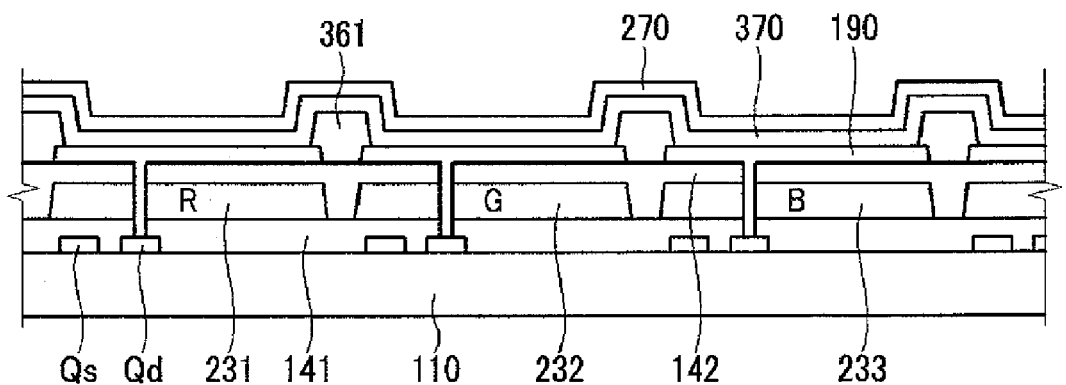
FIG. 6 is a cross-sectional view of an organic light emitting device according to an exemplary embodiment of the present invention.

FIG. 6 is a cross-sectional view of an organic light emitting device according to an exemplary embodiment of the present invention.

Referring to FIG. 6, a plurality of thin film transistor arrays are arranged on an insulating substrate 110. The thin film transistor array includes a switching thin film transistor Qs and a driving thin film transistor Qd connected to each pixel and that are electrically connected to each other.

A lower insulating layer 141 is formed on thin film transistor arrays Qs and Qd.

A red color filter 231, a green color filter 232, and a blue color filter 233 are respectively formed in a red pixel, a green pixel, and a blue pixel on the lower insulating layer 141, and a white color filter (not shown) which is transparent may be also formed.

An upper insulating layer 142 is formed on the color filters 231, 232, and 233, and a transparent pixel electrode 190 that functions as an anode electrode in each pixel is formed on the upper insulating layer 142. The pixel electrode 190 may be made of a transparent conductor such as ITO or IZO.

An organic light emitting member 370 is formed on the pixel electrode 190. The organic light emitting member may include an emission layer (not shown) for emitting light, and an auxiliary layer (not shown) for enhancing the emitting efficiency of the emission layer.

The organic light emitting member 370 may include a plurality of sub-emission layers (not shown) that are formed by sequentially depositing materials uniquely emitting the light such as red, green, and blue, and may emit white light by combining the colors thereof. In this exemplary embodiment, the sub-emission layers are not limited by being vertically deposited and may be horizontally deposited, and they are not limited by red, green, and blue and may be formed by combining the various colors so as to emit the white color.

The auxiliary layer may be at least one selected from an electron transport layer, a hole transport layer, an electron injection layer, and a hole injection layer.

A common electrode 270 is formed on the organic light emitting member. The common electrode 270 may be made of a metal having reflectability as a reflection member, and functions as a cathode electrode. The common electrode 270 is formed on the whole surface of the substrate 110, and forms a pair along with the pixel electrode 190 as the anode electrode to cause the current to flow to the organic light emitting member 370.

In the organic light emitting device, the color filters 231, 232, and 233 may also include different color pigments as the pigments for showing the corresponding colors. That is, the red color filter 231 includes a red pigment as a main component of a pigment, and at least one of a green pigment and a blue pigment may be included at 0.5-10 wt % among the entire pigment as an additional pigment. If necessary, a violet color pigment may be included. Also, the green color filter 232 includes a green pigment as the main component of the pigment, and at least one of a red pigment, a violet pigment, and a blue pigment may be included at 0.5-10 wt % among the entire pigment as an additional pigment. Also, the blue color filter 233 includes a blue pigment as a main component of a pigment, and at least one of a red pigment and a green pigment may be included at 0.5-10 wt % among the entire pigment as an additional pigment.

In this exemplary embodiment, all of the red color filter 231, the green color filter 232, and the blue color filter 233 must not include the different pigment, if just one of red color filter 231, the green color filter 232 and the blue color filter 233 includes the different color pigment, white light close to the target values of the color coordinates of the white light of the display device may be realized.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A color filter comprising:
    a first pigment including a red pigment as its main component and a first additional component, comprised of at least one of a green pigment and a blue pigment, at 0.5-10 wt % of the first pigment.

2. The color filter of claim 1, wherein:
    the red pigment include at least one selected from C.I. Pigment•Red 1, C.I. Pigment•Red 2, C.I. Pigment•Red 3, C.I. Pigment•Red 4, C.I. Pigment•Red 5, C.I. Pigment•Red 6, C.I. Pigment•Red 7, C.I. Pigment•Red 8, C.I. Pigment•Red 9, C.I. Pigment•Red 10, C.I. Pigment•Red 11, C.I. Pigment•Red 12, C.I. Pigment•Red 14, C.I. Pigment•Red 15, C.I. Pigment•Red 16, C.I. Pigment•Red 17, C.I. Pigment•Red 18, C.I. Pigment•Red 19, C.I. Pigment•Red 21, C.I. Pigment•Red 22, C.I. Pigment•Red 23, C.I. Pigment•Red 30, C.I. Pigment•Red 31, C.I. Pigment•Red 32, C.I. Pigment•Red 37, C.I. Pigment•Red 38, C.I. Pigment•Red 40, C.I. Pigment•Red 41, C.I. Pigment•Red 42, C.I. Pigment•Red 48:1, C.I. Pigment•Red 48:2, C.I. Pigment•Red 48:3, C.I. Pigment•Red 48:4, C.I. Pigment•Red 49:1, C.I. Pigment•Red 49:2, C.I. Pigment•Red 50:1, C.I. Pigment•Red 52:1, C.I. Pigment•Red 53:1, C.I. Pigment•Red 57, C.I. Pigment•Red 57:1, C.I. Pigment•Red 57:2, C.I. Pigment•Red 58:2, C.I. Pigment•Red 58:4, C.I. Pigment•Red 60:1, C.I. Pigment•Red 63:1, C.I. Pigment•Red 63:2, C.I. Pigment•Red 64:1, C.I. Pigment•Red 81:1, C.I. Pigment•Red 83, C.I. Pigment•Red 88, C.I. Pigment•Red 90:1, C.I. Pigment•Red 97, C.I. Pigment•Red 101, C.I. Pigment•Red 102, C.I. Pigment•Red 104, C.I. Pigment•Red 105, C.I. Pigment•Red 106, C.I. Pigment•Red 108, C.I. Pigment•Red 112, C.I. Pigment•Red 113, C.I. Pigment•Red 114, C.I. Pigment•Red 122, C.I. Pigment•Red 123, C.I. Pigment•Red 144, C.I. Pigment•Red 146, C.I. Pigment•Red 149, C.I. Pigment•Red 150, C.I. Pigment•Red 151, C.I. Pigment•Red 166, C.I. Pigment•Red 168, C.I. Pigment•Red 170, C.I. Pigment•Red 171, C.I. Pigment•Red 172, C.I. Pigment•Red 174, C.I. Pigment•Red 175, C.I. Pigment•Red 176, C.I. Pigment•Red 177, C.I. Pigment•Red 178, C.I. Pigment•Red 179, C.I. Pigment•Red 180, C.I. Pigment•Red 185, C.I. Pigment•Red 187, C.I. Pigment•Red 188, C.I. Pigment•Red 190, C.I. Pigment•Red 193, C.I. Pigment•Red 194, C.I. Pigment•Red 202, C.I. Pigment•Red 206, C.I. Pigment•Red 207, C.I. Pigment•Red 208, C.I. Pigment•Red 209, C.I. Pigment•Red 215, C.I. Pigment•Red 216, C.I. Pigment•Red 220, C.I. Pigment•Red 224, C.I. Pigment•Red 226, C.I. Pigment•Red 242, C.I. Pigment•Red 243, C.I. Pigment•Red 245, C.I. Pigment•Red 254, C.I. Pigment•Red 255, C.I. Pigment•Red 264, and C.I. Pigment•Red 265;
    wherein the green pigment of the first additional component includes at least one of C.I. Pigment•Green 7, C.I. Pigment•Green 36, and C.I. Pigment•Green 58; and
    wherein the blue pigment of the first additional component includes at least one of C.I. Pigment•Blue 15, C.I. Pigment•Blue 15:3, C.I. Pigment•Blue 15:4, C.I. Pigment•Blue 15:6, and C.I. Pigment•Blue 60.

3. A color filter comprising
    a second pigment including a green pigment as its main component and a second additional component, comprised of at least one of a red pigment, a violet pigment, and a blue pigment, at 0.5-10 wt % of the second pigment.

4. The color filter of claim 3, wherein:
    the red pigment of the second additional component includes at least one of C.I. Pigment•Red 1, C.I. Pigment•Red 2, C.I. Pigment•Red 3, C.I. Pigment•Red 4, C.I. Pigment•Red 5, C.I. Pigment•Red 6, C.I. Pigment•Red 7, C.I. Pigment•Red 8, C.I. Pigment•Red 9, C.I. Pigment•Red 10, C.I. Pigment•Red 11, C.I. Pigment•Red 12, C.I. Pigment•Red 14, C.I. Pigment•Red 15, C.I. Pigment•Red 16, C.I. Pigment•Red 17, C.I. Pigment•Red 18, C.I. Pigment•Red 19, C.I. Pigment•Red 21, C.I. Pigment•Red 22, C.I. Pigment•Red 23, C.I. Pigment•Red 30, C.I. Pigment•Red 31, C.I. Pigment•Red 32, C.I. Pigment•Red 37, C.I. Pigment•Red 38, C.I. Pigment•Red 40, C.I. Pigment•Red 41, C.I. Pigment•Red 42, C.I. Pigment•Red 48:1, C.I. Pigment•Red 48:2, C.I. Pigment•Red 48:3, C.I. Pigment•Red 48:4, C.I. Pigment•Red 49:1, C.I. Pigment•Red 49:2, C.I. Pigment•Red 50:1, C.I. Pigment•Red 52:1, C.I. Pigment•Red 53:1, C.I. Pigment•Red 57, C.I. Pigment•Red 57:1, C.I. Pigment•Red 57:2, C.I. Pigment•Red 58:2, C.I. Pigment•Red 58:4, C.I. Pigment•Red 60:1, C.I. Pigment•Red 63:1, C.I. Pigment•Red 63:2, C.I. Pigment•Red 64:1, C.I. Pigment•Red 81:1, C.I. Pigment•Red 83, C.I. Pigment•Red 88, C.I. Pigment•Red 90:1, C.I. Pigment•Red 97, C.I. Pigment•Red 101, C.I. Pigment•Red 102, C.I. Pigment•Red 104, C.I. Pigment•Red 105, C.I. Pigment•Red 106, C.I. Pigment•Red 108, C.I. Pigment•Red 112, C.I. Pigment•Red 113, C.I. Pigment•Red 114, C.I. Pigment•Red 122, C.I. Pigment•Red 123, C.I. Pigment•Red 144, C.I. Pigment•Red 146, C.I.

Pigment•Red 149, C.I. Pigment•Red 150, C.I. Pigment•Red 151, C.I. Pigment•Red 166, C.I. Pigment•Red 168, C.I. Pigment•Red 170, C.I. Pigment•Red 171, C.I. Pigment•Red 172, C.I. Pigment•Red 174, C.I. Pigment•Red 175, C.I. Pigment•Red 176, C.I. Pigment•Red 177, C.I. Pigment•Red 178, C.I. Pigment•Red 179, C.I. Pigment•Red 180, C.I. Pigment•Red 185, C.I. Pigment•Red 187, C.I. Pigment•Red 188, C.I. Pigment•Red 190, C.I. Pigment•Red 193, C.I. Pigment•Red 194, C.I. Pigment•Red 202, C.I. Pigment•Red 206, C.I. Pigment•Red 207, C.I. Pigment•Red 208, C.I. Pigment•Red 209, C.I. Pigment•Red 215, C.I. Pigment•Red 216, C.I. Pigment•Red 220, C.I. Pigment•Red 224, C.I. Pigment•Red 226, C.I. Pigment•Red 242, C.I. Pigment•Red 243, C.I. Pigment•Red 245, C.I. Pigment•Red 254, C.I. Pigment•Red 255, C.I. Pigment•Red 264, and C.I. Pigment•Red 265;

the green pigment of the main component includes at least one of C.I. Pigment•Green 7, C.I. Pigment•Green 36, and C.I. Pigment•Green 58;

the blue pigment of the second additional component includes at least one of C.I. Pigment•Blue 15, C.I. Pigment•Blue 15:3, C.I. Pigment•Blue 15:4, C.I. Pigment•Blue 15:6, and C.I. Pigment•Blue 60; and the violet pigment of the second additional component includes at least one of C.I. Pigment•Violet 1, C.I. Pigment•Violet 19, C.I. Pigment•Violet 23, C.I. Pigment•Violet 29, C.I. Pigment•Violet 32, C.I. Pigment•Violet 36, and C.I. Pigment•Violet 38.

5. A color filter comprising
a third pigment including a blue pigment as its main component and a third additional component, comprised of at least one of a red pigment and a green pigment, at 0.5-10 wt % of the third pigment.

6. The color filter of claim 5, wherein:
the red pigment of the third additional component includes at least one of C.I. Pigment•Red 1, C.I. Pigment•Red 2, C.I. Pigment•Red 3, C.I. Pigment•Red 4, C.I. Pigment•Red 5, C.I. Pigment•Red 6, C.I. Pigment•Red 7, C.I. Pigment•Red 8, C.I. Pigment•Red 9, C.I. Pigment•Red 10, C.I. Pigment•Red 11, C.I. Pigment•Red 12, Pigment•Red 14, C.I. Pigment•Red 15, C.I. Pigment•Red 16, C.I. Pigment•Red 17, C.I. Pigment•Red 18, C.I. Pigment•Red 19, C.I. Pigment•Red 21, C.I. Pigment•Red 22, C.I. Pigment•Red 23, C.I. Pigment•Red 30, C.I. Pigment•Red 31, C.I. Pigment•Red 32, C.I. Pigment•Red 37, C.I. Pigment•Red 38, C.I. Pigment•Red 40, C.I. Pigment•Red 41, C.I. Pigment•Red 42, C.I. Pigment•Red 48:1, C.I. Pigment•Red 48:2, C.I. Pigment•Red 48:3, C.I. Pigment•Red 48:4, C.I. Pigment•Red 49:1, C.I. Pigment•Red 49:2, C.I. Pigment•Red 50:1, C.I. Pigment•Red 52:1, C.I. Pigment•Red 53:1, C.I. Pigment•Red 57, C.I. Pigment•Red 57:1, C.I. Pigment•Red 57:2, C.I. Pigment•Red 58:2, C.I. Pigment•Red 58:4, C.I. Pigment•Red 60:1, C.I. Pigment•Red 63:1, C.I. Pigment•Red 63:2, C.I. Pigment•Red 64:1, C.I. Pigment•Red 81:1, C.I. Pigment•Red 83, C.I. Pigment•Red 88, C.I. Pigment•Red 90:1, C.I. Pigment•Red 97, C.I. Pigment•Red 101, C.I. Pigment•Red 102, C.I. Pigment•Red 104, C.I. Pigment•Red 105, C.I. Pigment•Red 106, C.I. Pigment•Red 108, C.I. Pigment•Red 112, C.I. Pigment•Red 113, C.I. Pigment•Red 114, C.I. Pigment•Red 122, C.I. Pigment•Red 123, C.I. Pigment•Red 144, C.I. Pigment•Red 146, C.I. Pigment•Red 149, C.I. Pigment•Red 150, C.I. Pigment•Red 151, C.I. Pigment•Red 166, C.I. Pigment•Red 168, C.I. Pigment•Red 170, C.I. Pigment•Red 171, C.I. Pigment•Red 172, C.I. Pigment•Red 174, C.I. Pigment•Red 175, C.I. Pigment•Red 176, C.I. Pigment•Red 177, C.I. Pigment•Red 178, C.I. Pigment•Red 179, C.I. Pigment•Red 180, C.I. Pigment•Red 185, C.I. Pigment•Red 187, C.I. Pigment•Red 188, C.I. Pigment•Red 190, C.I. Pigment•Red 193, C.I. Pigment•Red 194, C.I. Pigment•Red 202, C.I. Pigment•Red 206, C.I. Pigment•Red 207, C.I. Pigment•Red 208, C.I. Pigment•Red 209, C.I. Pigment•Red 215, C.I. Pigment•Red 216, C.I. Pigment•Red 220, C.I. Pigment•Red 224, C.I. Pigment•Red 226, C.I. Pigment•Red 242, C.I. Pigment•Red 243, C.I. Pigment•Red 245, C.I. Pigment•Red 254, C.I. Pigment•Red 255, C.I. Pigment•Red 264, and C.I. Pigment•Red 265;

the green pigment of the third additional component includes at least one of C.I. Pigment•Green 7, C.I. Pigment•Green 36, and C.I. Pigment•Green 58; and the blue pigment of the main component includes at least one of C.I. Pigment•Blue 15, C.I. Pigment•Blue 15:3, C.I. Pigment•Blue 15:4, C.I. Pigment•Blue 15:6, and C.I. Pigment•Blue 60.

7. A display device comprising:
a liquid crystal panel including a red color filter, a green color filter, and a blue color filter; and
a backlight unit providing light to the liquid crystal panel, wherein the red color filter includes a red pigment as the main component of its pigment and a first additional component, comprised of at least one of a green pigment and a blue pigment, at 0.5-10 wt % of the pigment of the red color filter.

8. The display device of claim 7, wherein
the green color filter includes a green pigment as the main component of its pigment and a second additional component, comprised of at least one of a red pigment, a blue pigment, and a violet pigment, at 0.5-10 wt % of the pigment of the green color filter.

9. The display device of claim 8, wherein
the blue color filter includes a blue pigment as the main component of its pigment and a third additional component, comprised of at least one of a red pigment and a green pigment, at 0.5-10 wt % of the pigment of the blue color filter.

10. The display device of claim 7, wherein
the blue color filter includes a blue pigment as the main component of its pigment and a third additional component, comprised of at least one of a red pigment and a green pigment, at 0.5-10 wt % of the pigment of the blue color filter.

11. The display device of claim 7, wherein
the light source of the backlight unit is a white LED manufactured by applying one of a YAG florescent to a blue light emitting diode (LED) chip and a silicate florescent to a blue light emitting diode (LED) chip.

12. A display device comprising:
a liquid crystal panel including a red color filter, a green color filter, and a blue color filter; and
a backlight unit providing light to the liquid crystal panel, wherein the green color filter includes a green pigment as the main component of its pigment and a second additional component, comprised of at least one of a red pigment, a blue pigment, and a violet pigment, at 0.5-10 wt % of the pigment of the green color filter.

13. The display device of claim 12, wherein the blue color filter includes a blue pigment as the main component of its pigment and a third additional component, comprised of at least one of a red pigment and a green pigment, at 0.5-10 wt % of the pigment of the blue color filter.

14. The display device of claim 12, wherein the light source of the backlight unit is a white LED manufactured by applying one of a YAG florescent to a blue light emitting diode (LED) chip and a silicate florescent to a blue light emitting diode (LED) chip.

15. A display device comprising:
a liquid crystal panel including a red color filter, a green color filter; and a blue color filter; and
a backlight unit providing light to the liquid crystal panel, wherein the blue color filter includes a blue pigment as the main component of its pigment and a third additional component, comprised of at least one of a red pigment and a green pigment, at 0.5-10 wt % the pigment of the blue color filter.

16. The display device of claim 15, wherein the light source of the backlight unit is a white LED manufactured by applying one of a YAG florescent to a blue light emitting diode (LED) chip and a silicate florescent to a blue light emitting diode (LED) chip.

17. A display device comprising:
a plurality of pixel electrodes;
a common electrode facing the pixel electrodes;
a white organic light emitting member inserted between the pixel electrodes and the common electrode; and
a red color filter, a green color filter, and a blue color filter respectively facing the pixel electrodes,
wherein the red color filter includes a red pigment as the main component of its pigment and a first additional component, comprised of at least one of a green pigment and a blue pigment, at 0.5-10 wt % of the pigment of the red color filter.

18. The display device of claim 17, wherein the green color filter includes a green pigment as the main component of its pigment, and a second additional component, comprised of at least one of a red pigment, a blue pigment, and a violet pigment, at 0.5-10 wt % of the pigment of the green color filter.

19. The display device of claim 18, wherein the blue color filter includes a blue pigment as the main component of its pigment and a third additional component, comprised of at least one of a red pigment and a green pigment, at 0.5-10 wt % of the pigment of the blue color filter.

20. The display device of claim 17, wherein the blue color filter includes a blue pigment as the main component of its pigment and a third additional component, comprised of at least one of a red pigment and a green pigment, at 0.5-10 wt % of the pigment of the blue color filter.

21. A display device comprising:
a plurality of pixel electrodes;
a common electrode facing the pixel electrodes;
a white organic light emitting member inserted between the pixel electrodes and the common electrode; and
a red color filter, a green color filter, and a blue color filter respectively facing the pixel electrodes,
wherein the green color filter includes a green pigment as the main component of its pigment and a second additional component, comprised of at least one of a red pigment, a blue pigment, and a violet pigment, at 0.5-10 wt % of the pigment of the green color filter.

22. The display device of claim 21, wherein the blue color filter includes a blue pigment as the main component of its pigment and a third additional component, comprised of at least one of a red pigment and a green pigment, at 0.5-10 wt % of the pigment of the blue color filter.

23. A display device comprising:
a plurality of pixel electrodes;
a common electrode facing the pixel electrodes;
a white organic light emitting member inserted between the pixel electrodes and the common electrode; and
a red color filter, a green color filter, and a blue color filter respectively facing the pixel electrodes,
wherein the blue color filter includes a blue pigment as the main component of its pigment and a third additional component, comprised of at least one of a red pigment and a green pigment, at 0.5-10 wt % of the pigment of the blue color filter.

\* \* \* \* \*